United States Patent
Atalla et al.

(10) Patent No.: US 9,071,319 B2
(45) Date of Patent: Jun. 30, 2015

(54) CIRCUIT AND METHOD FOR FILTERING ADJACENT CHANNEL INTERFERERS

(71) Applicant: Nvidia Corporation, Santa Clara, CA (US)

(72) Inventors: Essam Atalla, Richardson, TX (US); Abdellatif Bellaouar, Richardson, TX (US)

(73) Assignee: Nvidia Corporation, Santa Clara, CA (US)

( * ) Notice: Subject to any disclaimer, the term of this patent is extended or adjusted under 35 U.S.C. 154(b) by 79 days.

(21) Appl. No.: 14/023,623

(22) Filed: Sep. 11, 2013

(65) Prior Publication Data

US 2015/0072635 A1  Mar. 12, 2015

(51) Int. Cl.
| H04B 1/06 | (2006.01) |
| H04B 7/00 | (2006.01) |
| H04B 1/10 | (2006.01) |
| H04B 1/12 | (2006.01) |

(52) U.S. Cl.
CPC ....................... *H04B 1/12* (2013.01)

(58) Field of Classification Search
USPC ........ 455/232.1, 234.1, 234.2, 254, 266, 280, 455/287, 293, 296, 307, 312; 375/346, 350
See application file for complete search history.

(56) References Cited

U.S. PATENT DOCUMENTS

| 4,205,276 | A | * | 5/1980 | Wright et al. ................. 330/294 |
| 6,307,903 | B1 | * | 10/2001 | Harris et al. .................. 375/350 |
| 6,836,509 | B1 | * | 12/2004 | Nordin et al. ................. 375/220 |
| 7,196,574 | B1 | * | 3/2007 | Vishinsky .................... 327/557 |
| 2006/0291428 | A1 | * | 12/2006 | Filipovic ........................ 370/335 |
| 2007/0049332 | A1 | * | 3/2007 | Higuchi .................... 455/556.1 |
| 2008/0254758 | A1 | * | 10/2008 | Fujiwara ........................ 455/323 |
| 2011/0012678 | A1 | * | 1/2011 | Kannan et al. ................ 330/253 |

\* cited by examiner

*Primary Examiner* — Nguyen Vo

(57) ABSTRACT

A circuit and method for filtering adjacent channel interferers. One embodiment of an adjacent channel filtering circuit for reducing adjacent channel interference with an in-band signal, includes: (1) a radio frequency (RF) circuit configured to receive and down-convert an RF signal to a baseband signal containing an in-band signal and adjacent channel components, (2) a controlled single pole filter electrically coupled to the RF circuit and configured to reject the adjacent channel components and cause a predetermined attenuation in the in-band signal, (3) a baseband circuit coupled to the controlled single pole filter and configured to condition the baseband signal for conversion to a digital signal, and (4) a digital circuit coupled to the baseband circuit and configured to receive the digital signal and compensate for the predetermined attenuation.

22 Claims, 5 Drawing Sheets

CIRCUIT AND METHOD FOR FILTERING ADJACENT CHANNEL INTERFERERS

TECHNICAL FIELD

This application is directed, in general, to adjacent channel selectivity (ACS) in radio frequency (RF) communications and, more specifically, to pre-filtering adjacent channel interferers to avoid saturation of down-stream components.

BACKGROUND

Adjacent channel selectivity (ACS) is a measurement of a receiver's ability to process a desired signal while rejecting a strong signal in an adjacent frequency channel. Many communication systems operate in a band of frequencies divided into multiple channels, each channel being offset by some frequency from another. ACS is measured with respect to one of those channels, or the "assigned" channel. When receiving a signal on the assigned channel, a significant amount of interference is introduced into the receiver by adjacent channels. It is important for receivers to be able to detect the signal on the assigned channel and reject, filter or attenuate any contribution from the adjacent channels. ACS is quantified as the ratio of filter attenuation for the assigned channel frequency to the filter attenuation for an adjacent channel frequency.

Most modern communication standards specify a minimum level of rejection for those adjacent channels. The requirement is often dependent on the signal level and the offset between the assigned channel frequency and the adjacent channel frequency. For example, the $3^{rd}$ Generation Partnership Project (3GPP) standard, which applies to 3G and 4G receivers, specifies 5 MHz channel separation and calls for rejection of adjacent channel interferers that are roughly 40 dB higher than the signal level.

SUMMARY

One aspect provides an adjacent channel filtering circuit for reducing adjacent channel interference with an in-band signal. In one embodiment, the circuit includes: (1) a radio frequency (RF) circuit configured to receive and down-convert an RF signal to a baseband signal containing an in-band signal and adjacent channel components, (2) a controlled single pole filter electrically coupled to the RF circuit and configured to reject the adjacent channel components and cause a predetermined attenuation in the in-band signal, (3) a baseband circuit coupled to the controlled single pole filter and configured to condition the baseband signal for conversion to a digital signal, and (4) a digital circuit coupled to the baseband circuit and configured to receive the digital signal and compensate for the predetermined attenuation.

Another aspect provides a method of filtering adjacent channel interferers of an in-band signal. In one embodiment, the method includes: (1) receiving an RF signal, including the in-band signal, (2) down-converting the RF signal to a baseband signal, (3) employing a controlled single pole filter in filtering adjacent channel interference in the baseband signal and causing a predetermined attenuation in the in-band signal, (4) converting the baseband signal to a digital signal, and (5) digitally compensating for the predetermined attenuation.

Yet another aspect provides an RF receiver. In one embodiment, the receiver includes: (1) a mixer operable to down-convert a received RF signal to a baseband signal having an in-band component and an adjacent channel component, (2) a controlled single pole filter electrically coupled to the mixer and configured to reject the adjacent channel component and cause a predetermined attenuation in the in-band component, (3) a baseband circuit electrically coupled to the controlled single pole filter and configured to further filter the baseband signal, (4) an analog-to-digital converter (ADC) electrically coupled to the baseband chain and configured to convert the in-band component to a digital signal, and (5) a digital signal processor (DSP) electrically coupled to the ADC and configured to compensate for the predetermined attenuation in the digital signal.

BRIEF DESCRIPTION

Reference is now made to the following descriptions taken in conjunction with the accompanying drawings, in which.

DETAILED DESCRIPTION

Figure 1:
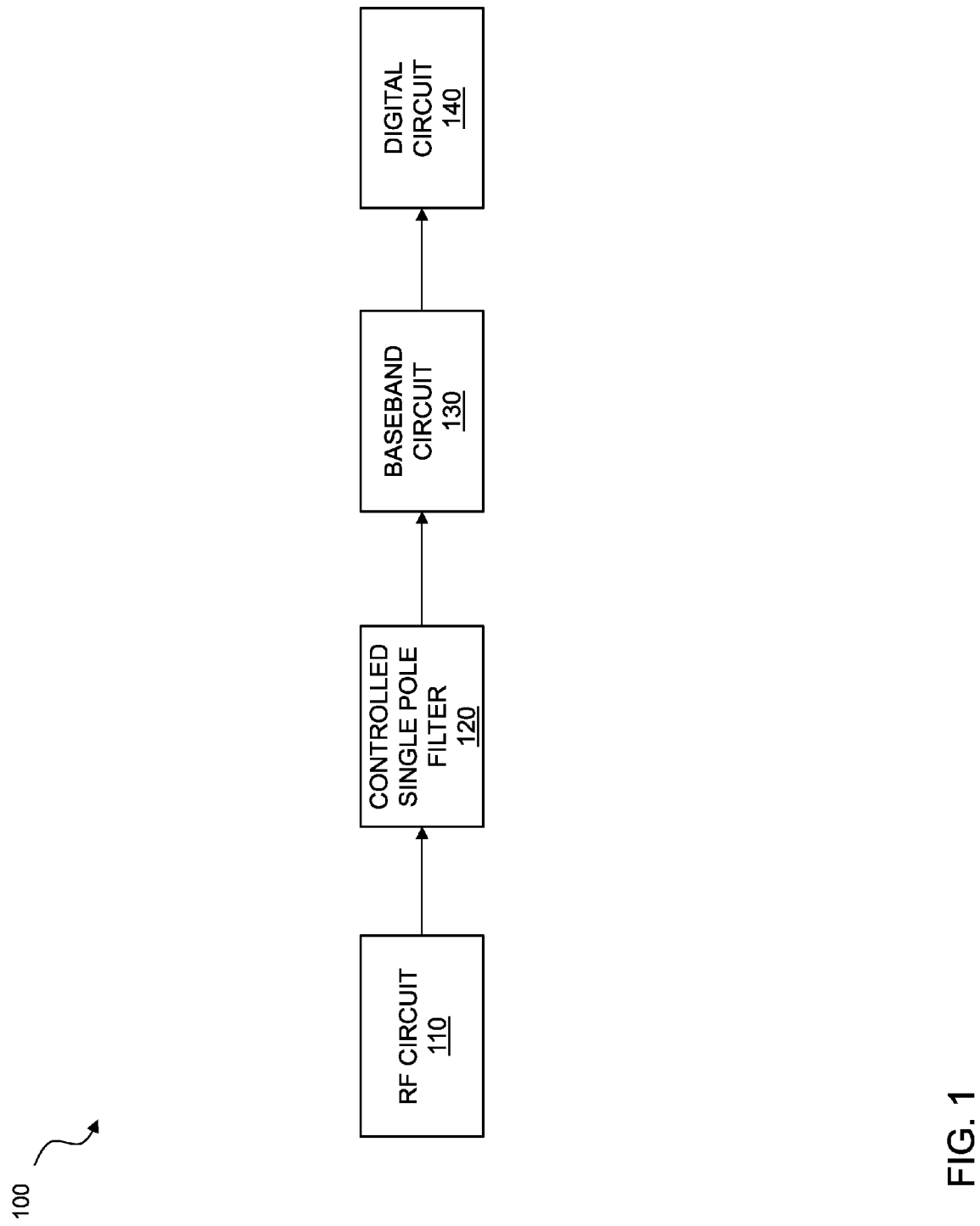
FIG. 1 is a block diagram of one embodiment of an adjacent channel rejection RF receiver.

A received signal typically includes the intended signal, or "in-band" component, and interferer components. Interferer components include those that are nearby and those that are far-out. Nearby interferers include adjacent channels that may be 2.5 MHz from the assigned channel edge. More importantly, nearby interferers are close enough to the assigned channel that filtering those nearby interferers often attenuates the in-band signal. Distant, or "far-out," interferers include channels that are not immediately adjacent to the assigned channel, but are several channels away, possibly offset by 10 MHz or more.

Adjacent channel rejection attenuates at least some of the interferer components and is often necessary for reliable detection of the in-band signal. Filtering for adjacent channel rejection is typically done in the analog domain to avoid saturation of the analog-to-digital converter (ADC). Typical receivers apply this filtering after the received signal is down-converted to a baseband signal and amplified to a detectable level. Passive pole filters are formed at the output ports of the mixer and baseband amplifier by introducing a shunt capacitance. Filtering of adjacent channels often attenuates the in-band signal, also referred to as "in-band droop." The mixer output pole and the baseband amplifier output pole vary across process and temperature. This pole variability introduces variability in the in-band attenuation and can degrade error vector magnitude (EVM), which is a measure of receiver performance. Receiver performance relies on a substantially flat in-band spectrum.

It is realized herein that while in-band attenuation may be unavoidable, precise in-band attenuation can be compensated for. Variation in passive pole filters makes them ill-suited for down-stream compensation. The in-band attenuation cannot be reliably known. It is realized herein that a controlled single pole filter can provide sufficient adjacent channel rejection and cause a known in-band attenuation that can be compensated for with precision equal to that of the control circuit. The in-band attenuation can be predetermined and digitally compensated for such that the receiver transfer function produces a flat in-band frequency response. It is also realized herein that the controlled single pole filtering should be applied before the baseband multi-stage filtering and before analog-to-digital conversion to avoid saturation of those components.

It is further realized herein that a controlled single pole filter can introduce noise into the receiver. The noise becomes more significant as the signal level nears sensitivity. Sensitivity is the minimum magnitude of an input signal necessary for an electronic device, such as a receiver, to produce a specified output. A receiver's sensitivity may be determined based on a desired signal-to-noise ratio (SNR) or some other criteria, and are typically specified by a standard, such as the 3GPP standard. Whether a signal level is near, or close to sensitivity varies among receiver embodiments. In certain embodiments, it is realized herein, a signal level 5 dB above sensitivity is close to sensitivity. In other embodiments, a signal level as high as 20 dB above sensitivity is still close to sensitivity. Yet, in other embodiments, even higher signal levels are considered close to sensitivity. What is considered close to sensitivity typically depends on component selection, application, and any applicable standards. It is also realized herein that adjacent channel rejection is typically only necessary for large signal levels, generally well above sensitivity. In communication systems that call for adjacent channel rejection, the adjacent channel interferers are typically only relevant above a specified signal level. For example, the 3GPP standard calls for rejection of the strongest adjacent channel interferers for signal levels roughly 41 dB above sensitivity. It is realized herein that the controlled single pole filter can be bypassed when signal levels are close to sensitivity, thereby avoiding the noise introduced by the controlled single pole filter. It is further realized herein that the bypass circuit should be deactivated, thereby engaging the controlled single pole filter, when signal levels approach the specified signal level. For example, in certain embodiments, the bypass switching point may be 10-15 dB below the specified signal level for adjacent channel rejection. It is realized herein the switching point should be selected such that the bypass circuit is active when the signal level is close to sensitivity, and inactive, or open, when the signal level approaches the specified signal level for adjacent channel rejection.

FIG. 1 is a block diagram of one embodiment of an RF receiver 100 capable of adjacent channel rejection. RF receiver 100 includes an RF circuit 110, a controlled single pole filter 120, a baseband circuit 130 and a digital circuit 140.

RF circuit 110 receives an RF signal on an assigned channel. The RF signal includes an in-band component and adjacent channel components, or adjacent channel interferers. The received RF signal is typically filtered and amplified before being down converted to a baseband signal, which is then amplified again.

Controlled single pole filter 120 receives the amplified baseband signal as an input. Controlled single pole filter 120 filters, or rejects the adjacent channel components of the baseband signal and causes a predetermined attenuation of the in-band component.

Baseband circuit 130 provides further filtering of the adjacent channel components and also conditions the baseband signal for conversion to digital. Filtering done by baseband circuit 130 may introduce further in-band attenuation that is compensated for within baseband circuit 130. Baseband circuit 130 typically includes multiple stages of filtering and amplification.

Digital circuit 140 includes an analog to digital converter (ADC) and a digital signal processor (DSP). The analog baseband signal from baseband circuit 130 is received by the ADC and converted to a digital signal. The digital signal should exhibit the predetermined attenuation imparted by controlled single pole filter 120. The digital signal is received by the DSP where it is further processed. One aspect of that processing is digitally compensating for the predetermined attenuation. Digital compensation is designed such that the combined frequency response of RF receiver 100 produces a flat in-band spectrum.

Figure 2:
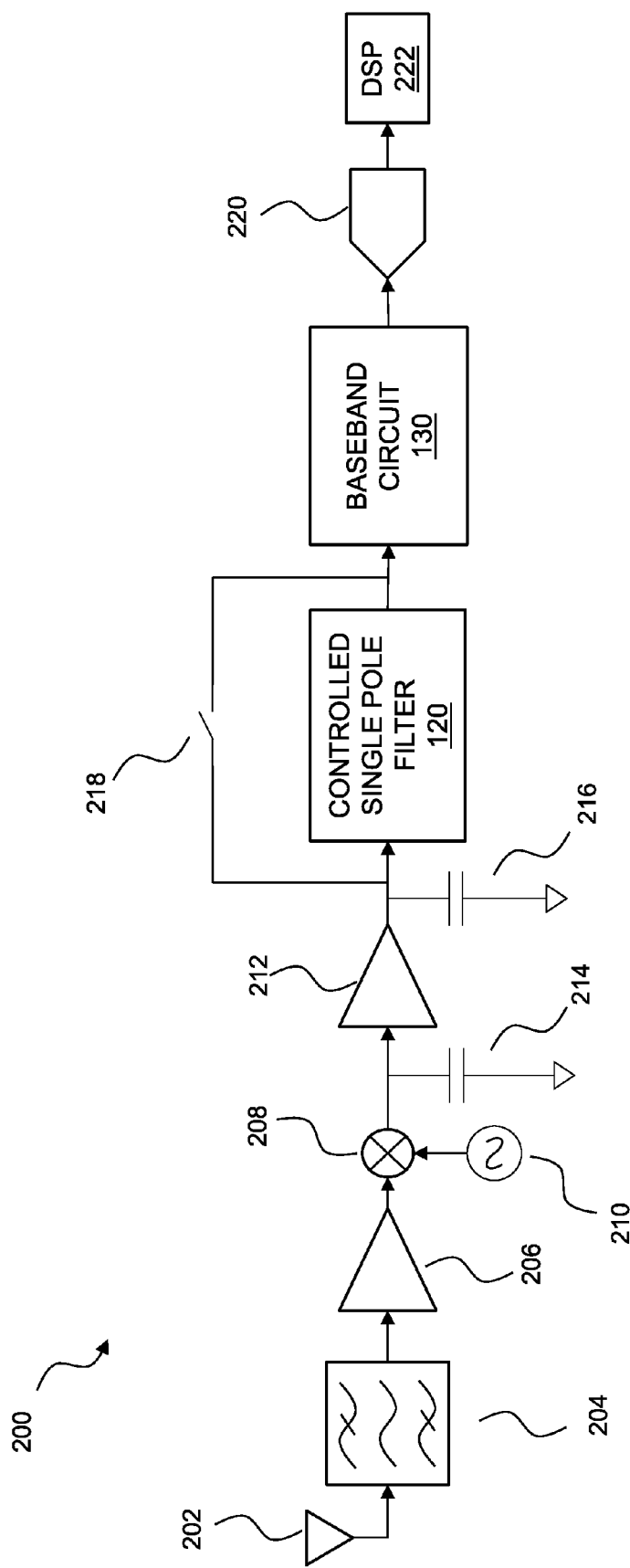
FIG. 2 is a functional block diagram of one embodiment of an adjacent channel rejection RF receiver.

FIG. 2 is a functional block diagram of one embodiment of an RF receiver 200 capable of adjacent channel rejection. RF receiver 200 includes controlled single pole filter 120 and baseband circuit 130 from the embodiment of FIG. 1. RF receiver 200 also includes an antenna 202, an RF filter 204, an RF low-noise amplifier (LNA) 206, a mixer 208, a voltage source 210, a baseband amplifier 212, a shunt capacitor 214, a shunt capacitor 216, a bypass circuit 218, an ADC 220 and a DSP 222.

An RF signal is received by antenna 202. The received signal is filter by RF filter 204 and then amplified by RF LNA 206. Voltage source 210 powers mixer 208, which down-converts the received RF signal to a baseband signal. Shunt capacitor 214 is electrically coupled to the output port of mixer 208. The combination of mixer 208 and shunt capacitor 214 forms a passive pole filter at the output of mixer 208. This passive pole filter is designed to reject far-out interferers.

The baseband signal is then amplified by baseband amplifier 212. Shunt capacitor 216 is electrically coupled to the output port of baseband amplifier 212, similar to the configuration of mixer 208 and shunt capacitor 214. The combination of baseband amplifier 212 and shunt capacitor 216 forms another passive pole filter at the output of baseband amplifier 212. This passive pole filter is also designed to reject far-out interferers. Some embodiments of RF receiver 200 may omit shunt capacitor 214 and shunt capacitor 216, thereby relying on other filtering stages, such as those in baseband circuit 130, to provide the necessary far-out interferer rejection.

Controlled single pole filter 120 is configured to receive the amplified baseband signal and filter the adjacent channel components. Controlled single pole filter 120, as in the embodiment of FIG. 1, also causes a predetermined in-band attenuation. Bypass circuit 218 is wired around controlled single pole filter 120, providing a bypass path from the output of baseband amplifier 212 to the input port of baseband circuit 130. When closed, bypass circuit 218 bypasses controlled single pole filter 120 and avoids any noise that would otherwise have been introduced by controlled single pole filter 120. Bypass circuit 218 is configured to deactivate when the baseband signal level is at least 25 dB above sensitivity. In alternate embodiments the switching point may be closer to or further from sensitivity, generally depending on the standard that applies to the given communication system. Certain embodiments may switch at 10 dB above sensitivity, while others switch at 40 dB above sensitivity. The purpose of bypass circuit 218 is to avoid significant levels of noise when signal levels are close to sensitivity. Certain embodiments of RF receiver 200 may omit bypass circuit 218 all-together.

Baseband circuit 130, as in the embodiment of FIG. 1, provides further filtering of the adjacent channel interferers and conditions the baseband signal for conversion to digital. The conditioned baseband signal is passed along to ADC 220, where it is converted to digital. The digital signal is then passed to DSP 222 for processing. DSP 222 is configured to digitally compensate the digital signal for the predetermined in-band attenuation caused by controlled single pole filter 120. The gain applied by DSP 222 correlates to the precise attenuation caused by controlled single pole filter 120.

Figure 3:
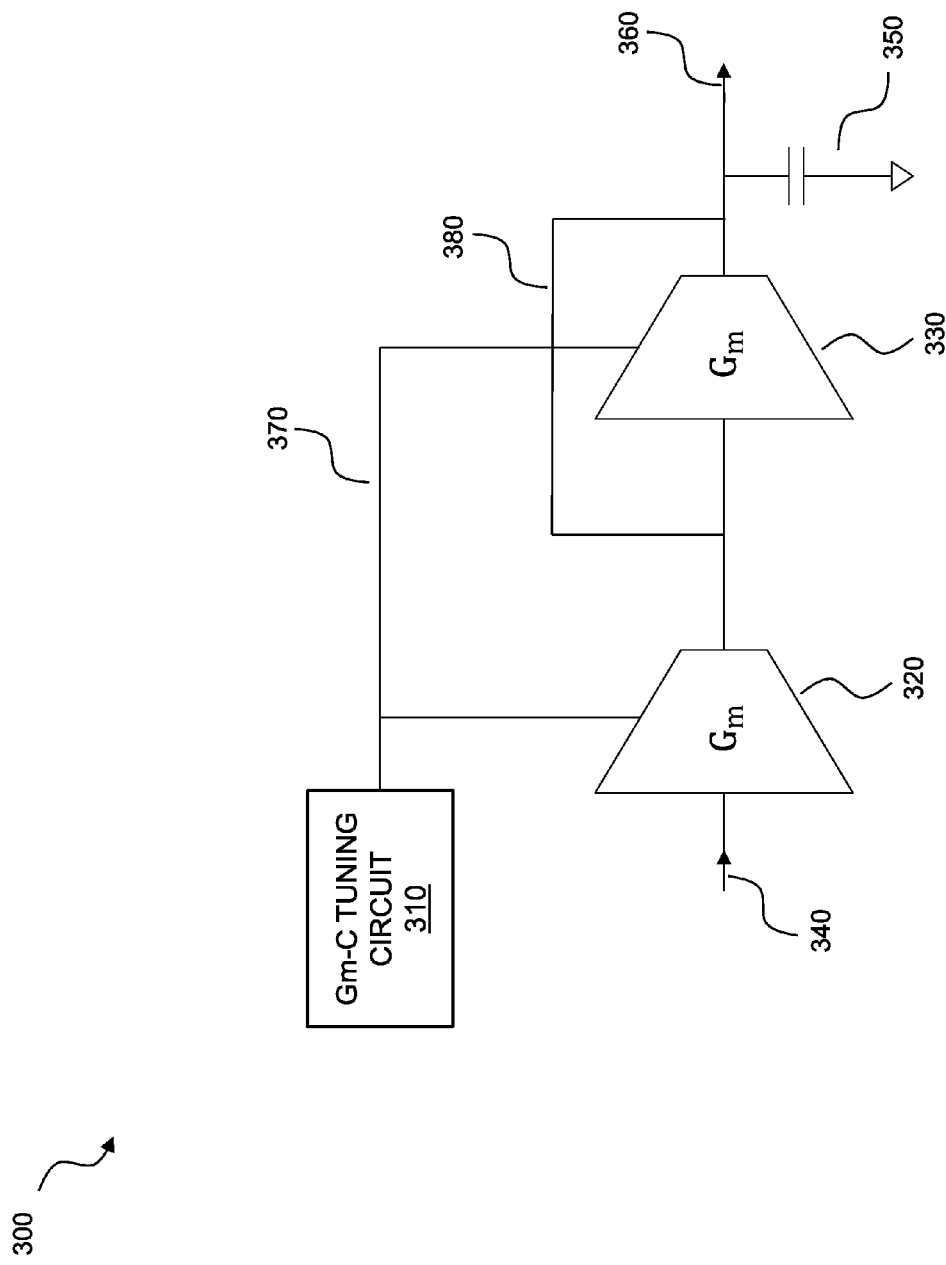
FIG. 3 is a functional block diagram of one embodiment of an analog controlled pole filter.

FIG. 3 is a functional block diagram of one embodiment of a controlled single pole filter 300. Controlled single pole filter 300 includes a $G_m$-C tuning circuit 310, a $G_m$ cell 320, a $G_m$ cell 330, a shunt capacitor 350 and a negative feedback circuit 380.

$G_m$-C tuning circuit 310 generates a supply voltage 370 that powers $G_m$ cell 320 and $G_m$ cell 330. $G_m$ cell 320 and $G_m$ cell 330 are electrically coupled in series. Negative feedback circuit 380 is electrically coupled between the output port of $G_m$ cell 330 and the input port of $G_m$ cell 330. Negative feedback circuit 380 allows $G_m$ cell 330 to operate as a resistance. Shunt capacitor 350 is electrically coupled to the output port of $G_m$ cell 330 such that a first-order single pole $G_m$-C filter is formed by the combination of $G_m$ cell 330 and shunt capacitor 350.

Supply voltage 370 is tuned to achieve a desired pole location of the single pole filter formed by $G_m$ cell 330 and shunt capacitor 350. When an input signal 340 is applied to the input port of $G_m$ cell 320, an output signal 360 is produced having the frequency response dictated by the first-order pole of the $G_m$-C filter.

Figure 4:
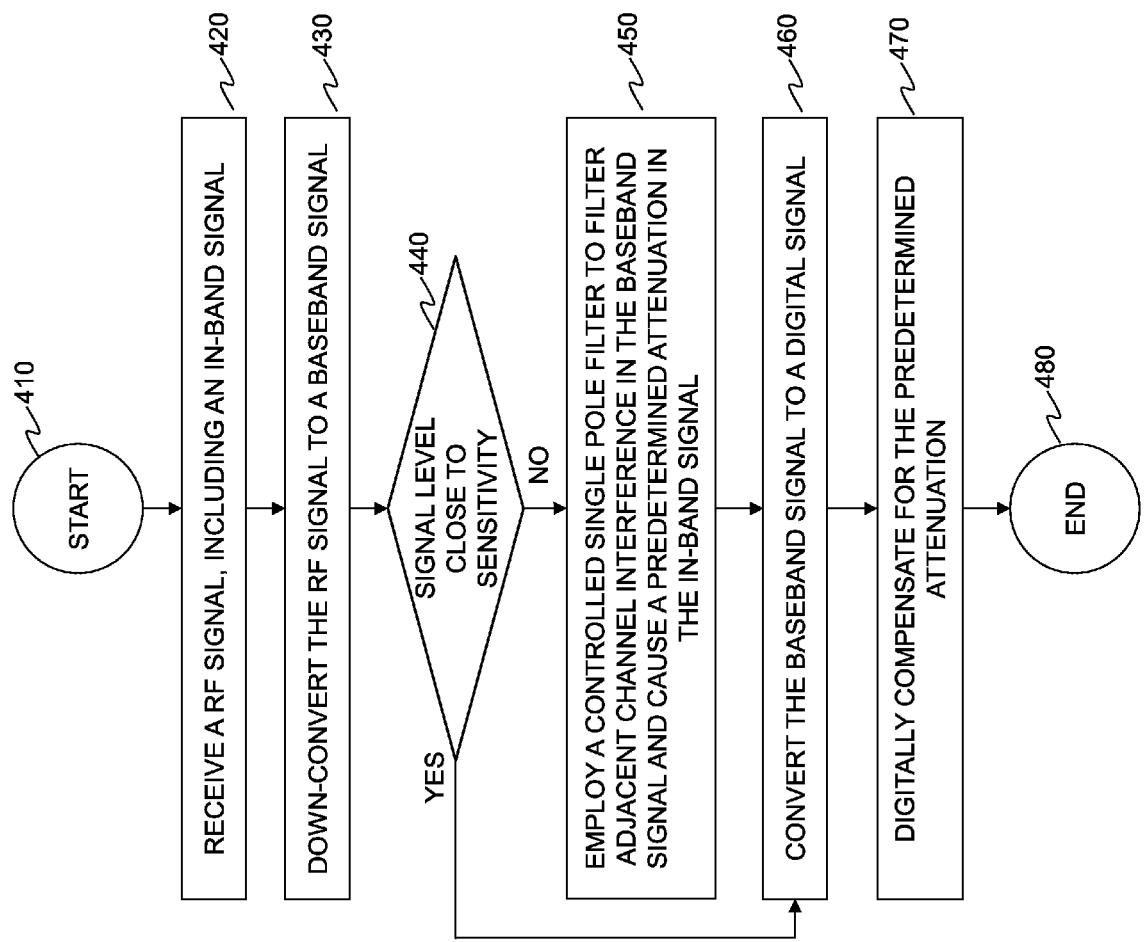
FIG. 4 is a flow diagram of one embodiment of a method for filtering adjacent channel interferers of an in-band signal.

FIG. 4 is a flow diagram of one embodiment of a method for filtering adjacent channel interferers of an in-band signal. The method begins in a start step 410. An RF signal is received in a receive step 420. The RF signal includes at least an in-band signal. The RF signal also includes adjacent channel interferers. In a mixing step 430, the received RF signal is down-converted to a baseband signal. In certain embodiments, mixing step 430 is preceded by an RF filtering step and an RF amplification step to condition the RF signal for down-conversion and ultimately detection.

In a bypass step 440 the signal level is checked to determine if the signal level is close to sensitivity. If the signal level is not close to sensitivity, the method proceeds to an adjacent channel rejection step 450. In adjacent channel rejection step 450, a controlled single pole filter is employed to filter adjacent channel interference in the baseband signal. The controlled single pole filter also causes a predetermined attenuation in the in-band signal. The baseband signal is then converted to a digital signal in an ADC step 460.

If the signal level is close to sensitivity, adjacent channel rejection step 450 is bypassed and the method proceeds to ADC step 460. In alternate embodiments ADC step 460 is preceded by a baseband conditioning step. Baseband conditioning typically includes multi-stage filtering and amplification to prepare the baseband signal for conversion to digital. Baseband conditioning may also include further filtering of the adjacent channel interference. To the extent baseband conditioning introduces in-band attenuation, it can be compensated for in the digital domain.

Once the baseband signal is converted to the digital signal in a DC step 460, the predetermined attenuation in the in-band signal is digitally compensated for in a compensation step 470. The gain applied in compensation step 470 correlates to the precise attenuation caused in adjacent channel rejection step 450. The combined frequency response of the method should produce a flat in-band spectrum for the digital signal. The method then ends in an end step 480.

Figure 5:
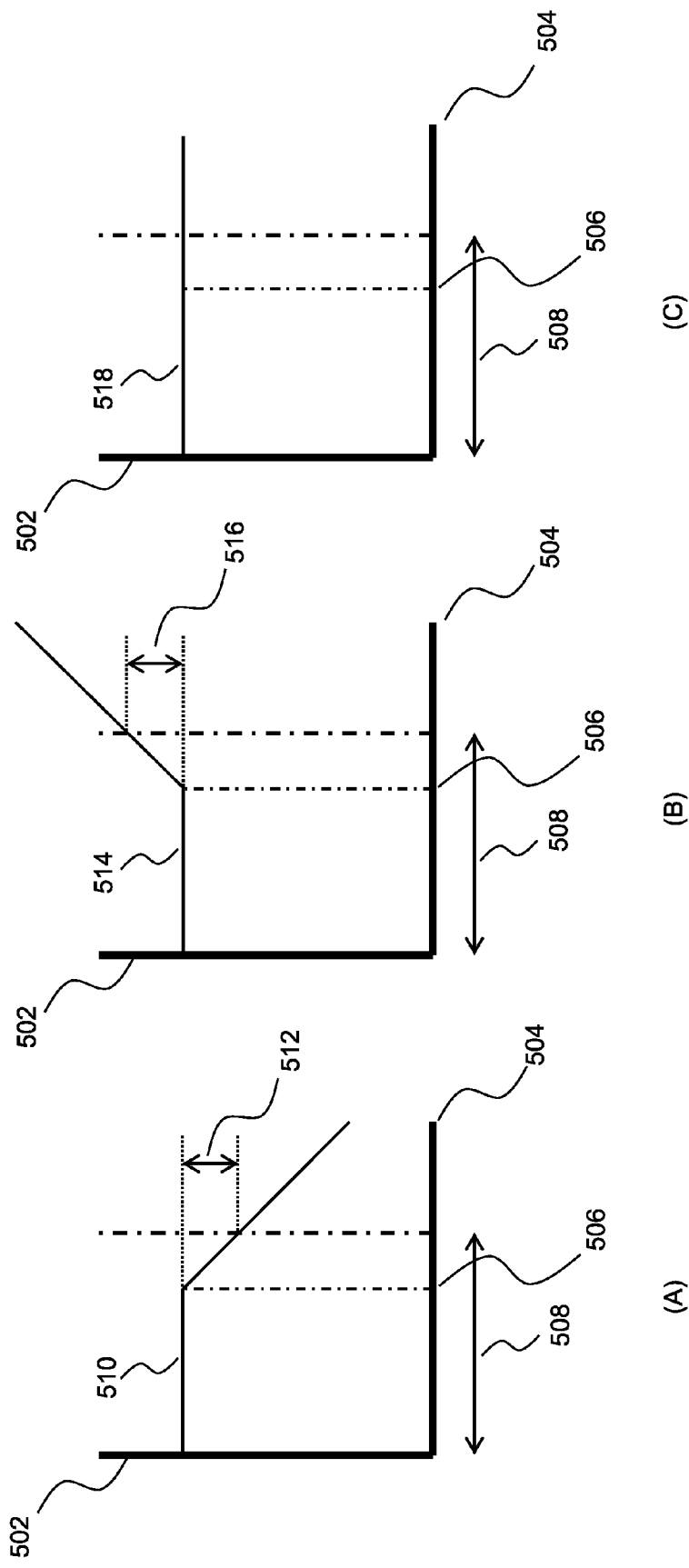
FIG. 5 is a plot diagram of frequency responses for a controlled filter, digital compensation, and a combination of the controlled filter and digital compensation.

FIG. 5 is a diagram of frequency responses for a controlled filter, digital compensation, and a combined response for the controlled filter and digital compensation. FIG. 5 includes three plots: plot 5-A, plot 5-B, and plot 5-C. Each of the plots includes a Y-axis 502 representing power and an X-axis 504 representing frequency. Additionally, each of the plots includes a channel bandwidth 508 and a vertical marker for a filter pole 506 of the controlled filter.

Plot 5-A illustrates a frequency response 510 of the controlled filter. Frequency response 510 is flat as frequency increases toward filter pole 506. As frequency increases beyond filter pole 506, frequency response 510 dips, as is shown by a negative slope. The dip in frequency response 510 indicates attenuation of a signal passing through the controlled filter. Given that filter pole 506 is within channel bandwidth 508, frequency response 510 exhibits a predetermined attenuation 512 in the in-band signal, also known as an in-band droop.

Plot 5-B illustrates a frequency response 514 of a digital circuit for digital compensation of predetermined attenuation 512. As in frequency response 510, frequency response 514 is flat as frequency increases toward filter pole 506. As frequency increases beyond filter pole 506, frequency response 514 rises, as is shown by a positive slope. The rise in frequency response 514 indicates a gain applied to a signal passing through the digital circuit. The digital circuit is configured to generate a gain 516 sufficient to compensate for predetermined attenuation 512.

Plot 5-C illustrates a combined frequency response 518 of a combination of the controlled filter and the digital circuit. Frequency response 518 is flat at least within channel bandwidth 508, and likely beyond. Frequency response 518 illustrates the advantage of having predetermined attenuation 512 and the ability to precisely digitally compensate with gain 516.

Those skilled in the art to which this application relates will appreciate that other and further additions, deletions, substitutions and modifications may be made to the described embodiments.

What is claimed is:

1. An adjacent channel filtering circuit for reducing adjacent channel interference with an in-band signal, comprising:
   a radio frequency (RF) circuit configured to receive and down-convert an RF signal to a baseband signal containing an in-band signal and adjacent channel components;
   a controlled filter electrically coupled to said RF circuit and configured to reject said adjacent channel components and cause a predetermined attenuation in said in-band signal;
   a baseband circuit, electrically coupled to and distinct from said controlled filter, configured to perform multi-stage filtering of said baseband signal and condition said baseband signal for conversion to a digital signal; and
   a digital circuit coupled to said baseband circuit and configured to receive said digital signal and compensate for said predetermined attenuation.

2. The adjacent channel filtering circuit recited in claim 1 wherein said RF circuit includes a mixer having an output port electrically coupled to a shunt capacitance, thereby forming a filter operable to reject far-out channel interferers.

3. The adjacent channel filtering circuit recited in claim 1 wherein said RF circuit includes a baseband amplifier having an input port through which said baseband signal is received and configured to amplify and transmit said baseband signal through an output port electrically coupled to said controlled filter.

4. The adjacent channel filtering circuit recited in claim 1 further comprising a bypass circuit electrically coupled between said RF circuit and said baseband circuit and configured to bypass said controlled filter based on a comparison of a signal level of said baseband signal to sensitivity of an electronic device employing said adjacent channel filtering circuit.

5. The adjacent channel filtering circuit recited in claim 4 wherein said bypass circuit is active if said baseband signal is below 15 decibels above sensitivity.

6. The adjacent channel filtering circuit recited in claim 1 wherein said controlled filter is a controlled single pole filter.

7. The adjacent channel filtering circuit recited in claim 1 wherein said controlled filter includes a Gm-C filter having a Gm cell and a shunt capacitor electrically coupled to the output of said Gm cell.

8. The adjacent channel filtering circuit recited in claim 7 wherein said controlled filter further includes a tuning circuit configured to generate a supply voltage for said Gm-C filter, said supply voltage being the basis for the location of the controlled pole in the frequency response of said Gm-C filter.

9. A method of filtering adjacent channel interferers of an in-band signal, comprising:
    receiving a radio frequency (RF) signal, including said in-band signal;
    down-converting said RF signal to a baseband signal;
    employing a controlled filter in filtering adjacent channel interference in said baseband signal and causing a predetermined attenuation in said in-band signal;
    employing a baseband circuit for multi-stage filtering of said baseband signal after said filtering of said adjacent channel interference, wherein said controlled filter is distinct from said baseband circuit;
    converting said baseband signal to a digital signal; and
    digitally compensating for said predetermined attenuation.

10. The method recited in claim 9 wherein said receiving includes filtering and amplifying said RF signal.

11. The method recited in claim 9 wherein said down-converting includes filtering far-out interferers from said baseband signal via a shunt capacitance electrically coupled to an output port of a mixer.

12. The method recited in claim 9 wherein said controlled filter is a controlled single pole filter.

13. The method recited in claim 9 wherein said employing includes generating a tuned control voltage on which the pole in said controlled filter is based.

14. The method recited in claim 9 wherein said controlled filter includes a Gm-C circuit.

15. The method recited in claim 9 wherein said digitally compensating includes applying a transfer function configured to generate an in-band gain correlating to said predetermined attenuation.

16. The method recited in claim 9 further comprising bypassing said employing said controller filter based on a comparison of a signal level of said baseband signal to sensitivity of an electronic device employing said method.

17. A radio frequency (RF) receiver, comprising:
    a mixer operable to down-convert a received RF signal to a baseband signal having an in-band component and an adjacent channel component;
    a controlled single pole filter electrically coupled to said mixer and configured to reject said adjacent channel component and cause a predetermined attenuation in said in-band component;
    a baseband circuit, electrically coupled to and distinct from said controlled single pole filter, configured to perform multi-stage filtering of said baseband signal;
    an analog-to-digital converter (ADC) electrically coupled to said baseband circuit and configured to convert said in-band component to a digital signal after said multi-stage filtering by said baseband circuit; and
    a digital signal processor (DSP) electrically coupled to said ADC and configured to compensate for said predetermined attenuation in said digital signal.

18. The RF receiver recited in claim 17 further comprising a bypass circuit configured to bypass said controlled single pole filter based on a comparison of a signal level of said RF signal to sensitivity of said RF receiver.

19. The RF receiver recited in claim 17 further comprising a baseband amplifier electrically coupled between said mixer and said controlled single pole filter.

20. The RF receiver recited in claim 19 further comprising shunt capacitors electrically coupled to respective output ports of said mixer and said baseband amplifier and configured to filter far-out interferer components of said baseband signal.

21. The RF receiver recited in claim 17 wherein said adjacent channel component includes only nearby interferers.

22. The RF receiver recited in claim 17 wherein said controlled single pole filter includes a tuned Gm-C first order single pole analog filter.

* * * * *